US009189756B2

(12) United States Patent
Gilbert et al.

(10) Patent No.: US 9,189,756 B2
(45) Date of Patent: Nov. 17, 2015

(54) CASE MANAGEMENT SYSTEM AND METHOD FOR COLLABORATIVE PROJECT TEAMING

(75) Inventors: Yuval S. Gilbert, Brookline, MA (US); Hunter R. Medney, Santa Clara, CA (US); Salvatore G. Mazzotta, Bedford, MA (US); Cindy Wu, Canton, MA (US); William Drake, Stoney Creek (CA)

(73) Assignee: International Business Machines Corporation, Armonk, NY (US)

( * ) Notice: Subject to any disclaimer, the term of this patent is extended or adjusted under 35 U.S.C. 154(b) by 1198 days.

(21) Appl. No.: 10/945,829

(22) Filed: Sep. 21, 2004

(65) Prior Publication Data

US 2006/0064434 A1 Mar. 23, 2006

(51) Int. Cl.
*G06F 17/30* (2006.01)
*G06Q 10/06* (2012.01)

(52) U.S. Cl.
CPC ............ *G06Q 10/06* (2013.01); *G06F 17/3012* (2013.01)

(58) Field of Classification Search
CPC ............................ G06Q 10/06; G06F 17/3012
USPC .......... 703/3, 200, 201, 203; 707/3, 200, 201, 707/203, 802
See application file for complete search history.

(56) References Cited

U.S. PATENT DOCUMENTS

| 5,019,961 | A | | 5/1991 | Addesso et al. |
|---|---|---|---|---|
| 5,787,175 | A | * | 7/1998 | Carter ........................... 713/165 |
| 5,960,200 | A | * | 9/1999 | Eager et al. .................... 717/147 |
| 5,999,911 | A | * | 12/1999 | Berg et al. .......................... 705/9 |
| 6,061,692 | A | * | 5/2000 | Thomas et al. ................ 707/613 |
| 6,088,702 | A | * | 7/2000 | Plantz et al. .............. 707/103 R |
| 6,192,394 | B1 | | 2/2001 | Gutfreund et al. |
| 6,438,743 | B1 | * | 8/2002 | Boehm et al. ................. 717/122 |
| 6,446,077 | B2 | * | 9/2002 | Straube et al. ......................... 1/1 |
| 6,453,312 | B1 | * | 9/2002 | Goiffon et al. ......................... 1/1 |
| 6,487,569 | B1 | * | 11/2002 | Lui et al. ........................ 715/230 |
| 6,507,845 | B1 | * | 1/2003 | Cohen et al. ................... 707/100 |
| 6,542,884 | B1 | * | 4/2003 | Soderberg et al. .................... 1/1 |
| 6,732,148 | B1 | * | 5/2004 | Estrada et al. ................ 709/205 |
| 6,760,721 | B1 | * | 7/2004 | Chasen et al. ......................... 1/1 |
| 6,769,606 | B1 | * | 8/2004 | Blosser et al. ................ 235/379 |
| 7,062,532 | B1 | * | 6/2006 | Sweat et al. .................. 709/205 |

(Continued)

OTHER PUBLICATIONS

Khoshafian, Setrag, et al., Object Orientation, 2nd Edition, John Wiley & Sons, Inc., New York, NY, @1995, pp. 78-84, 94-104 and 138-139.*

(Continued)

*Primary Examiner* — Robert Stevens
(74) *Attorney, Agent, or Firm* — Schmeiser, Olsen & Watts LLP

(57) ABSTRACT

Described are a system and method for facilitating collaboration on a project by multiple team members. A plurality of projects and a plurality of documents are stored in persistent storage of a server system. A user launches an application program that displays an expandable and collapsible view showing each project of the plurality of projects for which the user is a team member and each document linked to each of the shown projects. Searchable metadata is associated with each project. The searchable metadata associated with each project is propagated to each document linked to that project. A given document is searched for using the metadata propagated from the project linked to that document.

17 Claims, 6 Drawing Sheets

(56) References Cited

U.S. PATENT DOCUMENTS

| | | | |
|---|---|---|---|
| 7,127,501 | B1* | 10/2006 | Beir et al. ............... 709/219 |
| 8,880,461 | B2* | 11/2014 | Jenkins et al. ............... 707/608 |
| 2001/0033298 | A1* | 10/2001 | Slotznick ............... 345/758 |
| 2002/0065800 | A1* | 5/2002 | Morlitz ............... 707/1 |
| 2002/0075305 | A1 | 6/2002 | Beaton et al. |
| 2002/0078088 | A1 | 6/2002 | Kuruoglu et al. |
| 2002/0091836 | A1* | 7/2002 | Moetteli ............... 709/227 |
| 2002/0107994 | A1 | 8/2002 | Rickards, III et al. |
| 2002/0124051 | A1 | 9/2002 | Ludwig et al. |
| 2003/0023677 | A1 | 1/2003 | Morison Zuill et al. |
| 2003/0046548 | A1* | 3/2003 | Brown et al. ............... 713/182 |
| 2003/0061330 | A1 | 3/2003 | Frisco et al. |
| 2003/0105734 | A1 | 6/2003 | Hitchen et al. |
| 2003/0112273 | A1 | 6/2003 | Hadfield et al. |
| 2003/0115326 | A1* | 6/2003 | Verma et al. ............... 709/225 |
| 2003/0149725 | A1* | 8/2003 | Worthen ............... 709/204 |
| 2004/0054627 | A1* | 3/2004 | Rutledge ............... 705/50 |
| 2004/0230793 | A1* | 11/2004 | Estrada et al. ............... 713/156 |
| 2004/0260717 | A1* | 12/2004 | Albornoz et al. ............... 707/102 |
| 2005/0102534 | A1* | 5/2005 | Wong ............... 713/201 |
| 2005/0192822 | A1* | 9/2005 | Hartenstein et al. ............... 705/1 |
| 2006/0036568 | A1* | 2/2006 | Moore et al. ............... 707/1 |
| 2006/0184673 | A1* | 8/2006 | Liebman ............... 709/225 |
| 2009/0254422 | A1* | 10/2009 | Jenkins et al. ............... 705/11 |

OTHER PUBLICATIONS de Bruijn, Jos, et al., "Semantic Information Integration in the COG project", Digital Enterprise Research Institute (DERI), Institute of Science, Univ. of Innsbruck, © 2002, 52 pages.*

Bézivin, Jean, et al., "The ATL Transformation-based Model Management Framework", Research Report No. 03.08, IRIN, Univ. of Nantes, Sep. 9, 2003, 17 pages.*

Horton, Ivor, Java 2—SDK 1.4 Edition, Wiley Publishing, Inc., Indianapolis, IN, @2003, pp. 237-245.*

Gray, J. L. et al.; "Bridging Islands of Information with Cooperation Software"; AT&T Technology; vol. 7, No. 1; pp. 26-33; 1982.

Penedo, M.; "An Active Web-based Virtual Room for Small Team Collaboration"; Software Process Improvement and Practice; vol. 5, No. 4; pp. 251-261; Dec. 2000.

Bhargava, H. et al.; "On Integrating Collaboration and Decision Analysis Techniques"; Journal of Organizational Computing; vol. 4, No. 3; pp. 297-316; 1994.

Ledyard, J. et al.; "Using Computerized Exchange Systems to Solve an Allocation Problem in Project Management"; Journal of Organizational Computing; vol. 4., No. 3; pp. 271-296; 1994.

Dewan, P. et al.; "An Editing-Based Characterization of the Design Space of Collaborative Applications"; Journal of Organizational Computing; vol. 4, No. 3; pp. 219-239; 1994.

* cited by examiner

FIG. 5

CASE MANAGEMENT SYSTEM AND METHOD FOR COLLABORATIVE PROJECT TEAMING

FIELD OF THE INVENTION

The invention relates generally to computer software for collaborative computing. More particularly, the invention relates to a case management system and method for facilitating collaboration on projects among individuals of an organization and for ensuring that the intellectual capital produced during the execution of each project can be found by and made accessible to other individuals in the organization.

BACKGROUND

Many organizations, large ones in particular, have many ongoing and completed projects. Each of these projects usually involves the participation of multiple individuals, often geographically separated from each other. Organizations often want and need individuals who are working together on a project to be able to share information and communicate with one another. In the performance of their respective projects these individuals produce numerous materials, typically in the form of documents and records of their online communications (i.e., emails and chat messages) that memorialize the knowledge acquired during the project. This knowledge, also referred to as intellectual capital, often proves valuable to other individuals in the organization who are not part of the project. Projects of an organization often resemble other currently active or previously completed projects. Consequently, organizations typically want this knowledge to be made available and readily discoverable across the organization so that individuals can profit from the accomplishments of others. Often, though, the vast quantity of intellectual capital can make it cumbersome for individuals to find relevant information.

SUMMARY

In one aspect, the invention features a method for facilitating collaboration on a project by multiple team members. A plurality of projects and a plurality of documents are stored in persistent storage of a server system. A user launches an application program that displays an expandable and collapsible view showing each project of the plurality of projects for which the user is a team member and each document linked to each shown project. Searchable metadata is associated with each project. The searchable metadata associated with each project is propagated to each document linked to that project. A given document is searched for using the metadata propagated from the project linked to that document.

In another aspect, the invention features an apparatus for facilitating collaboration on a project by multiple team members. The apparatus includes means for storing a plurality of projects and a plurality of documents in persistent storage of a server system, means for launching, by a user, an application program that displays an expandable and collapsible view showing each project of the plurality of projects for which the user is a team member and each document linked to each of the shown projects, means for associating searchable metadata with each project; means for propagating the searchable metadata associated with each project to each document linked to that project, and means for searching for a given document using the metadata propagated from the project linked to that document.

In yet another aspect, the invention features a computer program product for use with a computer system. The computer program product comprises a computer useable medium having embodied therein program code comprising program code for storing a plurality of projects and a plurality of documents in persistent storage of a server system, program code for launching, by a user, an application program that displays an expandable and collapsible view showing each project of the plurality of projects for which the user is a team member and each document linked to each of the shown projects, program code for associating searchable metadata with each project, program code for propagating the searchable metadata associated with each project to each document linked to that project, and program code for searching for a given document using the metadata propagated from the project linked to that document.

In still yet another aspect, the invention features a computer data signal embodied in a carrier wave for use with a computer system having a display and capable of generating a user interface through which a user may interact with the computer system. The computer data signal comprises program code for storing a plurality of projects and a plurality of documents in persistent storage of a server system, program code for launching, by a user, an application program that displays an expandable and collapsible view showing each project of the plurality of projects for which the user is a team member and each document linked to each of the shown projects; program code for associating searchable metadata with each project; program code for propagating the searchable metadata associated with each project to each document linked to that project; and program code for searching for a given document using the metadata propagated from the project linked to that document.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 5 is an exemplary screen shot of a view produced when a user prepares to submit a search query.

DETAILED DESCRIPTION

The present invention features a case management (CM) system for managing large numbers of accounts, projects, and documents (referred to generally as objects). The CM system provides a computer-based environment in which users can collaborate on current projects and capitalize upon the projects completed by others. The CM system facilitates searching by organizing the objects in a hierarchical structure and associating metadata with the objects at the various levels of the hierarchy. Objects at lower levels of the hierarchy inherit metadata from objects at the higher levels. Search results are actionable; that is, users can perform actions and work directly on accounts, projects, and documents that are returned by a search. Knowledge acquired in the course of achieving the deliverables of a project can become available to others within an organization by becoming part of the searchable volume of objects when the project is closed. This knowledge or intellectual capital is typically in the form of documents but can include preserved email and chat communications. To facilitate project collaboration, the CM system integrates various desktop applications, such as email, instant messaging, and word processing, with project-oriented business processes. Users of the CM system are thus able to collaborate with each other by inviting people to join projects, exchanging email and chat messages, and by sharing documents.

Figure 1:
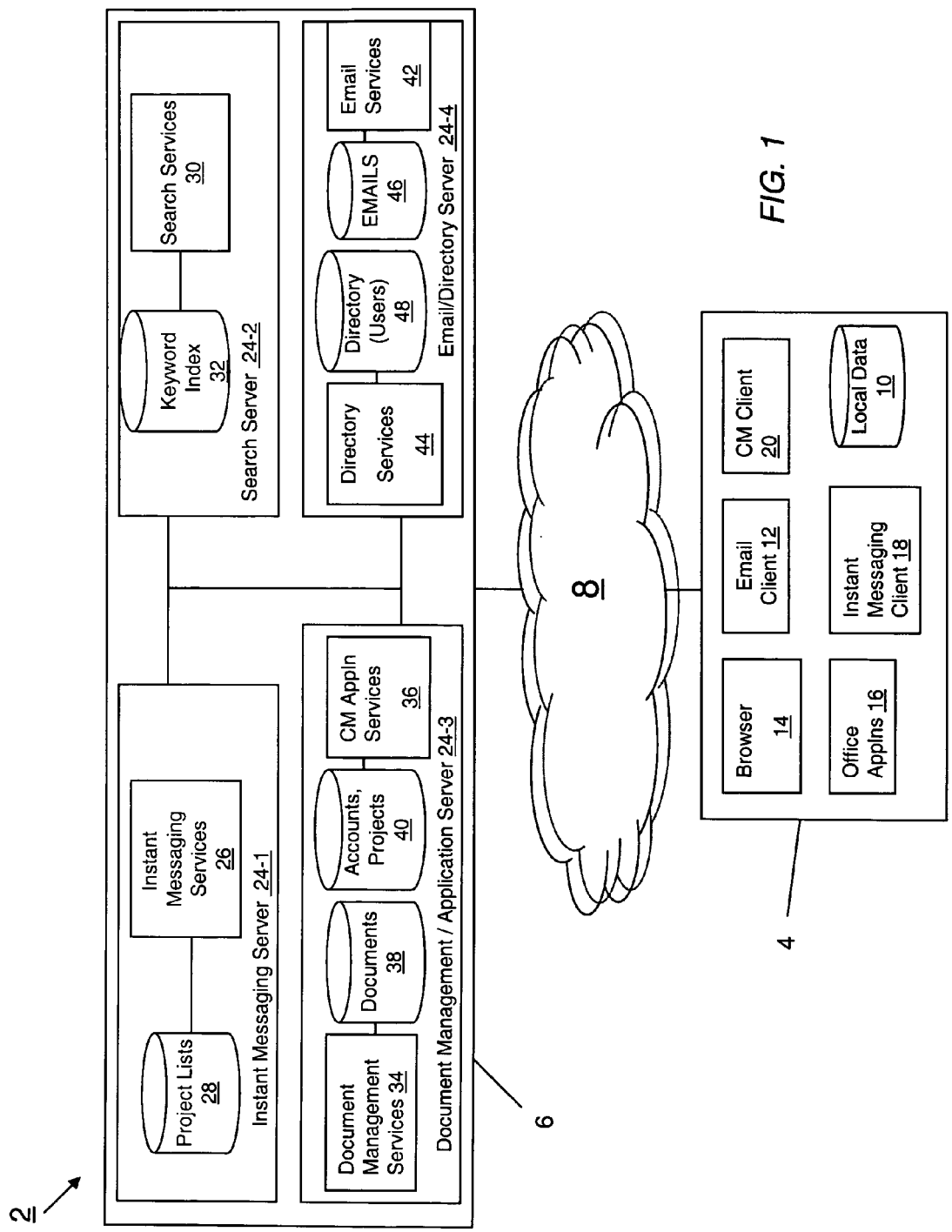
FIG. 1 is a block diagram of an embodiment of client-server environment within which a case management system of the present invention operates.

FIG. 1 shows an embodiment of a computing environment 2 in which the invention can be practiced. The computing environment 2 includes a client system 4 in communication with a server system 6 over a network 8. The client system 4 can be any personal computer (e.g., 486, Pentium, Pentium II, Macintosh), Windows-based terminal, wireless device, information appliance, RISC Power PC, X-device, workstation, mini-computer, mainframe computer, cell phone, personal digital assistant (PDA) or other computing device that has hardware such as a display screen, one or more input devices (e.g., keypad, stylus, keyboard, mouse, touch-pad, and trackball), a processor for executing application programs, and sufficient persistent storage 10 for storing such application programs and related information.

Application programs on the client system 4 include, but are not limited to, an electronic mail client program 12, browser software 14, office applications 16 such as a spread sheet, a word processor, and slide presentation software, an instant messaging program 18, and case management (CM) client software 20. The email client program 12, browser software 14, office applications 16, and instant messaging program 18 can be a proprietary or commercially available program, such as Lotus NOTES™ for email, Lotus Same Time for instant messaging, Microsoft Internet Explorer™ for browser software, and Microsoft WORD for word processing. The browser software 14 can incorporate a JAVA™ virtual machine for interpreting JAVA™ code (i.e., applets, scripts) and applications.

The CM client software 20 provides the client-side functionality of the CM system of the invention. An individual user accesses the CM system at the client system 4 by launching the CM client software 20. In a preferred embodiment, the CM client software 20 communicates with each of the email 12, browser 14, office 16, and instant messaging 18 applications to integrate their respective capabilities with project collaboration. To integrate commercially available embodiments of applications 12, 14, 16, and 18 and the CM client software 20 may require modification to those applications. The CM client software 20 can communicate with fewer than all of these applications without departing from the spirit of the invention. Although shown to be individual programs, any combination of the applications 12, 14, 16, 18, and 20 can be provided as a single application program.

The application programs execute within an operating system. Examples of operating systems supported by the client system 4 include Windows 95, Windows 98, Windows NT 4.0, Windows XP, Windows 2000, Windows CE, Macintosh, Java, LINUX, and UNIX. The client system 4 also includes a network interface (not shown) for communicating over the network 8. The network 8 can be a local-area network (LAN), a metro-area network (MAN), or wide-area network (WAN), such as the Internet or World Wide Web. Users of the client system 4 can connect to the network 8 through one of a variety of connections, such as standard telephone lines, digital subscriber line, LAN or WAN links (e.g., T1, T3), broadband connections (Frame Relay, ATM), and wireless connections (e.g., 802.11(a), 802.11(b), 802.11(g)).

In one embodiment, the server system 6 includes an instant messaging server 24-1, a search server 24-2, a document management and application server 24-3, and an e-mail and directory server 24-4 (generally, server 24). Although shown separately, these servers 24 can be integrated in a single computing machine. Alternatively, different computing machines geographically collocated or distributed across the network 8, can be used to implement the servers 24.

Each server 24 includes programs for performing particular services and persistent storage for keeping data related to those services. The instant messaging server 24-1 includes software 26 for providing instant messaging services and persistent storage 28 for storing project membership lists. Components of the search server 24-2 are software 30 for performing search services and persistent storage 32 for maintaining an index of searching keywords to be used in searching for managed objects, such as accounts, projects, and documents.

The document management and application server 24-3 includes software 34 for providing document management services and software 36 for providing case management server-side services. Documents managed by the document management software 34 reside in persistent storage 38. Persistent storage 40 maintains the account and project information accessed by the case management server-side services software 36.

The e-mail and directory server 24-4 includes software 42 for supporting email communication among users on the network 8 and software 44 for providing directory services. The email services software 42 accesses persistent storage 46, which stores the email messages, and the directory services software 46 accesses user directory information in persistent storage 48. Although shown as separate repositories, the persistent storage 28, 32, 28, 46, 48 can be combined in one or more repositories.

When a user logs onto the client system 4 and executes the CM client software 20, a browser window opens and the user is authenticated to the CM system. The CM client software 20 communicates over the network 8 with the server system 6 to accomplish the authentication and other case management activities of the invention. To communicate information across the network 8, in one embodiment, the client and server systems 4, 6 use standard transport protocols, such as TCP/IP and the hypertext transfer protocol (HTTP).

In brief overview, the CM system of the invention is project-based. A project represents a set of activities and deliverables, often defined contractually, which are performed by one or more individuals. Deliverables are often in the form of documents. Projects can also contain project-related non-deliverable documents, such as internal budgets and plans, client materials, reference information, document templates, project notes, and e-mails. In general, documents can mean deliverables, non-deliverables, or a combination thereof.

Individuals who are associated with a project are referred to as team members of the project. Team members include project managers, who are the individuals associated with creating a given project, and project contributors. Project contributors are generally the authors and editors of documents. Projects are performed for and associated with an account. Accounts represent clients or customers. There are also individuals associated with an account (e.g., an Account Executive, who manages the account).

Projects have associated with them a state that defines the status of the project. In one embodiment, projects are either open (active) or closed (inactive). In general, when a project is open, team members are able to collaborate in the generating and editing of documents related to the project, and when the project is closed, select documents of the project become publicly available (i.e., available not only to the team members, but also to the community of users of the case management system within the confines of an organization). Access to documents, when the project is closed, is restricted to read-only so that the contents of the documents cannot be changed.

Figure 2:
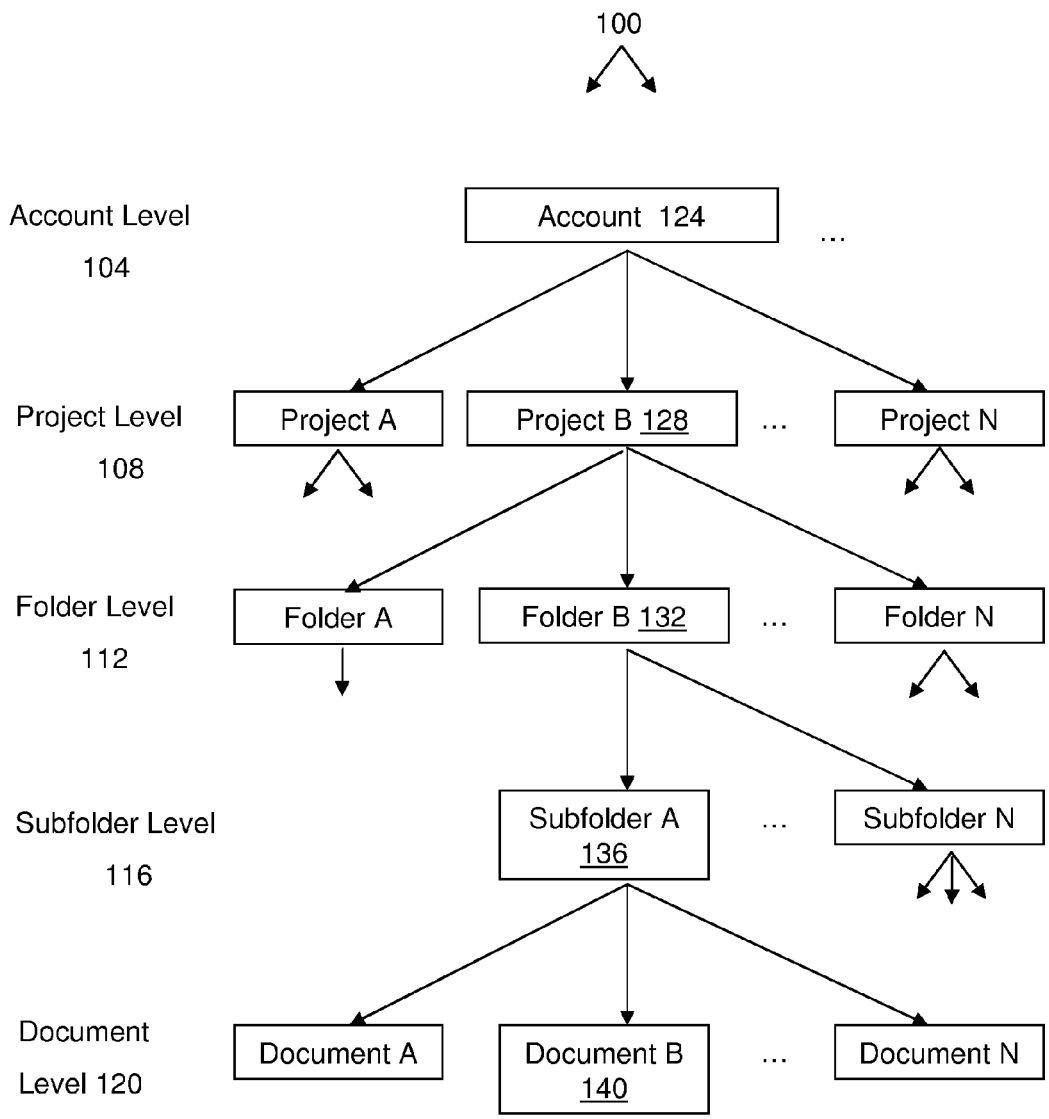
FIG. 2 is a block diagram of an embodiment of an object hierarchy used by the case management system to organize case-related information.

Centered on a project-based business model, the CM system of the invention follows an organization model that places project-related objects into a hierarchical structure. In one embodiment, project-related objects include accounts, projects, folders, optional subfolders, and documents. FIG. 2 shows an example of an object hierarchy 100 used by the CM system to organize project-related information. Listed from top to bottom, the hierarchy 100 includes an account level 104, a project level 108, a folder level 112, a subfolder level 116, and a document level 120. For a given account object 124 (representing an account), there can be one or more projects objects 128 for the account, one or more folder objects 132 for each project object 128, zero or more subfolder objects 136 for each folder object 132, and zero or more document objects 140 for each subfolder object 136. The terms folder and subfolder are used interchangeably. Both types of objects can contain either subfolders or documents. This particular embodiment of a hierarchical model produces a tree with each account being the root of a separate tree and the documents being the leaves of the trees. By this hierarchy 100, documents 140 are linked to projects 128 (through zero or more folders or subfolders) and projects 128 are linked to accounts 124. Other hierarchical models with fewer, more, or different levels and objects than those shown can be used without departing from the principles of the invention.

Metadata is defined for each object at each level of the hierarchy 100. For an account, for example, metadata can include, but are not limited to, customer name, customer address, and Account Executive. The user of the CM system enters the metadata for a given account or project upon generating that account or project.

Metadata associated with an object at a particular level in the hierarchy automatically propagates to each object at a hierarchical level below that particular level. That is, in addition to its own metadata, each object inherits metadata from objects at higher levels in the hierarchy 100. For example, a given project object has its own metadata and the metadata inherited from the account from which the project depends. As another example, in addition to its own metadata, a given document has metadata inherited from the folder containing the document, from the project containing that folder, and from the account containing that project. The direction of propagation is illustrated in FIG. 2 by the arrows linking the objects.

The propagation of the metadata downwards through the hierarchy 100 facilitates searching among vast numbers of accounts, projects, and documents. For example, a search for a document can be confined to a particular project within a particular account and having a particular team member. The metadata at each of the levels enables searching for objects at that level; that is, a user can search for accounts, projects, or documents that meet specified criteria. Also, searches for objects at the lower hierarchical levels (i.e., documents) not only report as search results those lower level objects satisfying the search criteria, but also serve to identify related higher level objects. For example, the propagated metadata associated with a particular document found as a result of a search identifies the account and project to which that document belongs.

The CM system provides various capabilities for each of the objects illustrated in the hierarchy 100. Table 1 provides a summary of these capabilities for each object level and those individuals who can perform such capabilities. The capabilities shown are merely illustrative; variations of such capabilities can be implemented without departing from the principles of the invention.

TABLE 1

| Object | Capabilities | Individuals |
| --- | --- | --- |
| Account | Create, view, edit, rename, search, view activity, add and remove favorite, chat. | Account Executive and Administrator |
| Project | Create, view, edit, rename, open, join, close, synchronize, view activity, search, add and remove favorite, chat. | Team members and Account Executive and Administrator |
| Folder | Create, view, edit, delete, rename, view activity, chat. | Team members and Account Executive and Administrator |
| Subfolder | Create, view, edit, delete, rename, view activity, chat. | Team members and Account Executive and Administrator |
| Document | Create, view, edit, delete, rename, restore, check in, checkout, send in email, copy, move, replace, search, share, add and remove favorite, view revisions, promote, view activity, approve, reject, chat. | Team members and Account Executive and Administrator |

Figure 3:
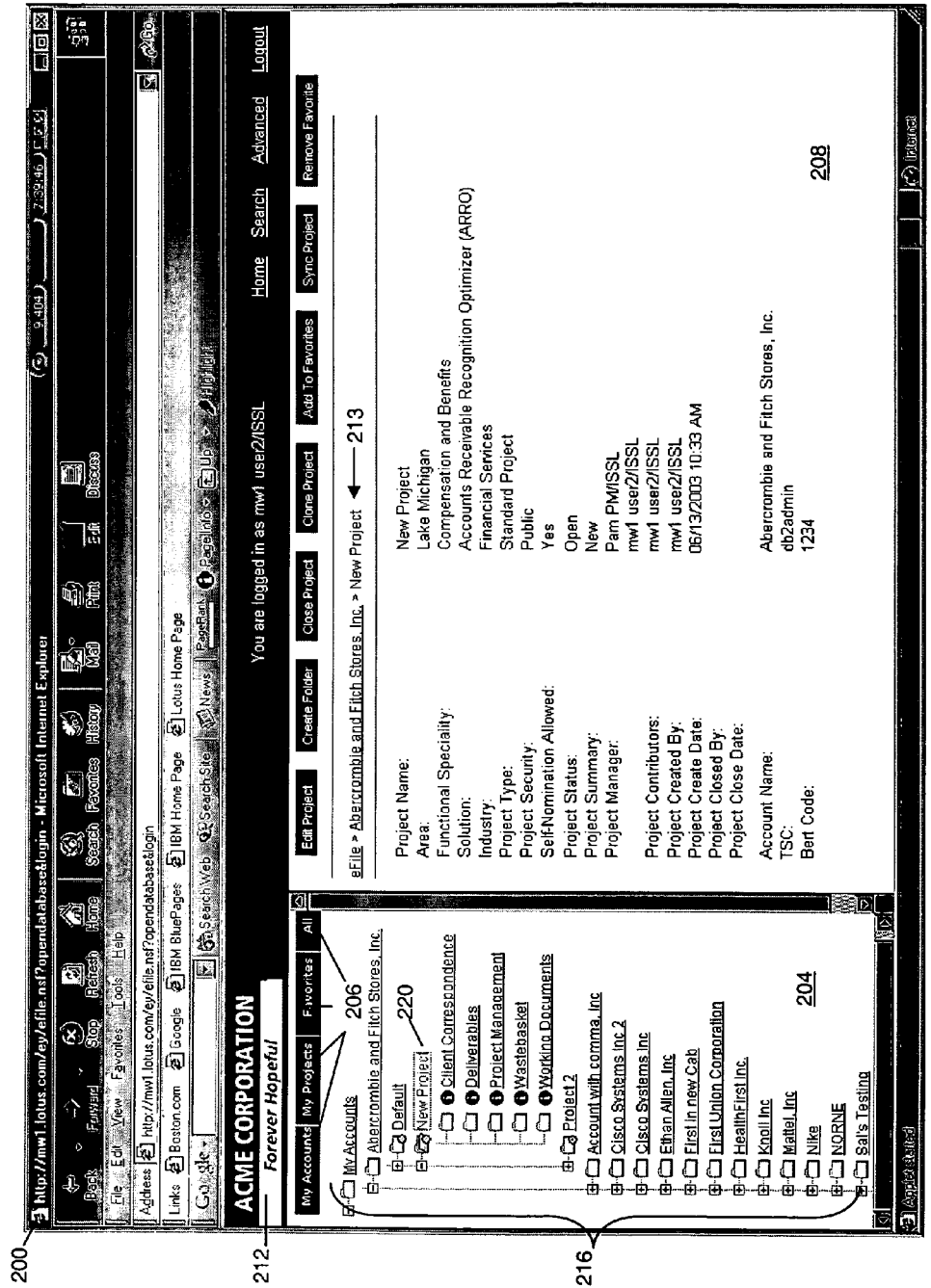
FIG. 3 is an exemplary screen shot of a view produced by the case management system, including a navigation pane and a content pane.

FIG. 3 shows an example of a graphical user interface (GUI) 200 presented to a user after the user launches the CM client software 20 on the client system 4 and is authenticated to access the CM system. Through the GUI 200, the CM system provides users with a navigation scheme corresponding to the hierarchical organizational model described above. In one embodiment, the GUI 200 appears within a conventional browser window. The GUI 200 includes a navigation pane 204, a content pane 208, and a banner pane 212.

The navigation pane 204 presents a dynamically updated personalized view of accounts, projects, folders, and subfolders based on the project membership of the user who has logged onto the CM system and upon the type of view selected by the user using the graphical buttons 206 (described below). The content pane 208 provides the means to display the properties (i.e., metadata) associated with accounts, projects, folders, subfolders, and documents, and the ability to take action on each object. The banner pane 212 displays the name of the user who has logged in, and allows users to go to the home page, access their profile, perform basic and advanced searches, and logout of the CM system. A breadcrumb trail 213 also appears in the content pane 208 and includes an ordered list of nodes that represents each of the levels of the hierarchy and provides the context of the content pane 208. The breadcrumb trail 213 provides an alternative means for navigation by allowing users to go directly to a different level of the hierarchy by clicking on a node name.

An expandable and collapsible navigation tree 216 appears within the navigation pane 204 displaying the hierarchical organizational model of accounts, projects, folders, and subfolders. When a user joins a project or is added as member to a project, the navigation tree 216 is automatically updated (upon the next occurrence of the client system 4 communicating with the server system 6), showing the new account or new project (or new account and project) and associated folders. Users access and work on accounts, projects, folders, and documents through the navigation tree 216. For example, to access and act upon a project found during a search, that project is first added to the navigation tree 216 (for example, as a favorite).

In one embodiment, the navigation tree 216 uses the tree expansion (+) and contraction (−) model of the Windows Explorer™ model to expand and collapse the tree. A minus sign means that the account, project, or folder is fully expanded. A plus sign means that more objects are contained within the folder. Icons 220 representing projects show the status (i.e., open or closed) of the project as part of the icon. In FIG. 3, the displayed projects, Default and New Project, each have a shaded circle indicating that both projects are open. Selecting an account name or project name displays the properties (metadata) of that account or project in the content pane 208. In FIG. 3, the project called New Project has been selected and the metadata associated with New Project appears in the content pane 208. The type of metadata shown is exemplary. This metadata includes that metadata inherited from the account (here, Abercrombie and Fitch Stores, Inc.).

Figure 4:
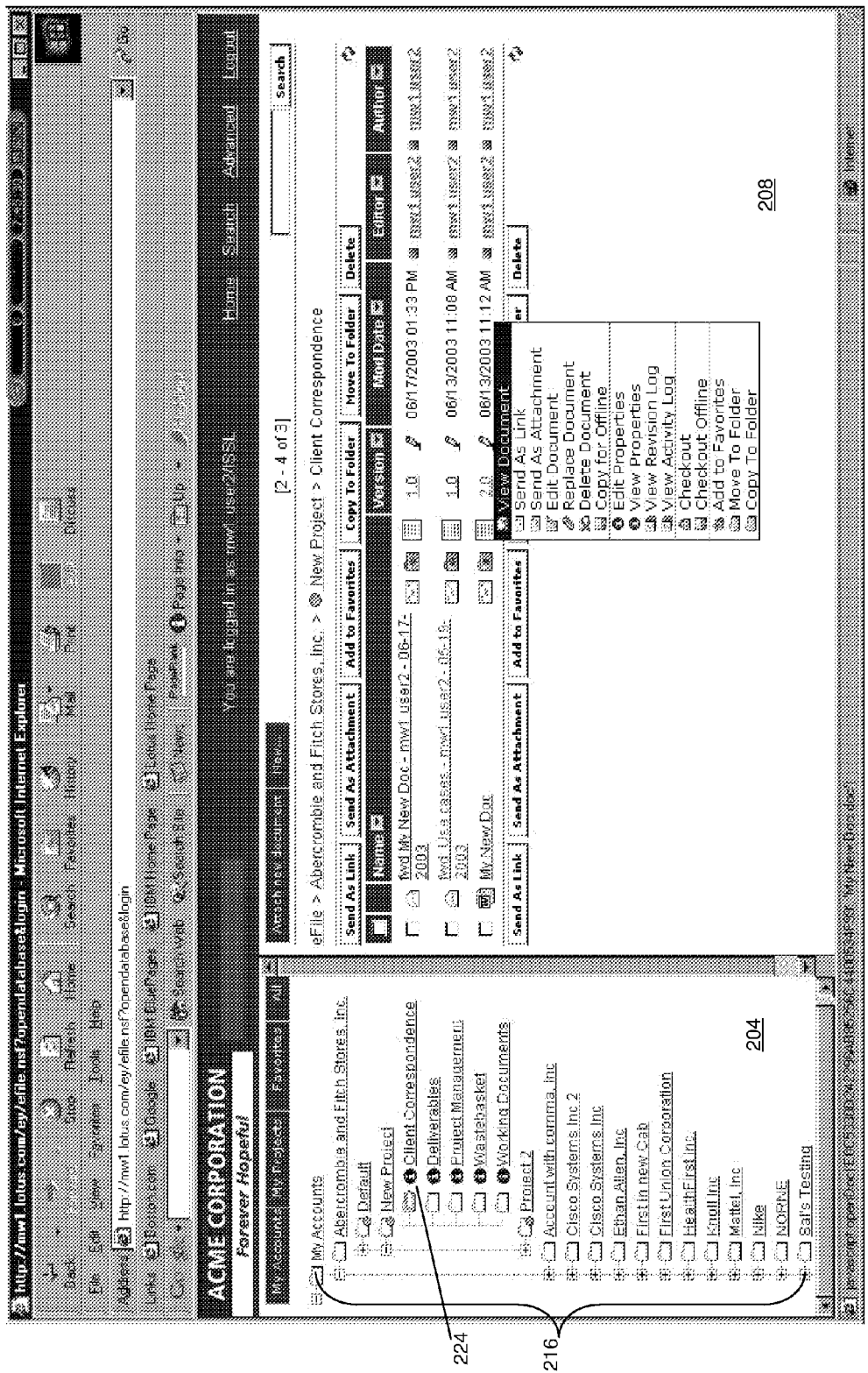
FIG. 4 is an exemplary screen shot of a view produced when a user selects a particular project in the navigation pane and causes documents generated for that project to appear in the content pane.

Selecting an account name or project name also expands the navigation tree 216 to display each project or folder, respectively, within that account or project. Clicking on a folder displays the contents of the folder (a folder view of a set of documents) in the content pane 208. FIG. 4 shows, for example, the documents within the selected folder called Client Correspondence. Clicking on an information icon (i) 224 next to the folder name displays the properties (metadata) of the folder in the content pane 208.

The CM system also allows the user to organize accounts, projects and documents in a user-defined portion of the navigation tree 216 called My Favorites. For example, a user can select any account as a favorite. Selecting a favorite account automatically includes all closed projects in that account and all open projects in that account in which the user is a team member. Projects in the account are automatically added to the favorite account when the projects are closed because such projects automatically become public.

A user can also select any closed project or any open project in which the user is a team member as a favorite, and any document from a closed project or from an open project in which the user is a team member, as a favorite. The CM system can also track previously accessed accounts, projects, folders, and documents in a portion of the navigation tree 216 called My History.

Returning to FIG. 3, in one embodiment the navigation pane 204 includes a set of graphical buttons 206. The user can select one of these buttons 206 to produce a specific view of accounts, projects, folders and documents. One button 206, called My Accounts, enables the user to choose All accounts, Active accounts, or Closed accounts. (Accounts do not have state; the open and closed states here refer to the state of projects in those accounts.) Selecting All accounts causes a display of accounts with open and closed accounts. Selecting Active accounts displays a view of those accounts containing active projects for which the user is a team member. Accounts that contain closed projects only are not displayed. Selecting Closed accounts displays a view of those accounts containing closed projects. Accounts that contain active projects only are not displayed.

Another graphical button 206, called My Projects, enables the user to choose among All, Active projects, or Closed projects. In the resulting view in the navigation pane 204, projects are presented independently of their parent account. Selecting all projects displays a view of all of projects of the user; selecting Active projects produces a display of active projects only of that user; and selecting closed projects produces a display of closed projects only of that user.

A third graphical button 206, called Favorites, provides the user with a personal organization of objects of interest. A user can specify specific accounts, projects, and documents as favorites by activating an "Add to Favorites" action when viewing the properties of the object or after receiving search results. The user can add an object to a favorite list if the user is a member of an active project.

A fourth graphical button 206, called All, enables the user to view concurrently all categories of account and project organizations (i.e., My Accounts, My Projects, and Favorites).

In brief overview, users of the CM system can engage in various project-oriented processes including creating and editing an account, creating and editing projects associated with an account; creating and collaborating on documents associated with projects, closing projects, and searching for and leveraging intellectual capital or knowledge.

Accounts

Through the CM system, users can create and edit accounts. Accounts are organization-wide, and special validation is performed on account metadata to ensure that duplicate accounts are not created. Accounts may also be created through an administrative process, for example, by sending a request to an organization responsible for creating (and managing) accounts.

After an account is established, users can create projects for the account. When an account is edited, some of the metadata associated with the account may become updated (for example, a timestamp or revision number). The updated metadata may be selectively or automatically propagated to existing active projects, folders, and documents having that account as a parent. Alternatively, the updated metadata may be propagated to newly created projects, based on the system profile.

Creating Projects

Users can create projects through the CM system within the context of an existing account. The project automatically inherits metadata from the account, and the user specifies values for other metadata fields associated with the project. One example of the metadata is the type of the project solution. For example, in FIG. 3, the solution type is identified as Accounts Receivable Recognition Optimizer. The user can specify more than one solution type. Based on each solution type identified, a predefined template folder is created for the project and populated with template documents for each specific solution type. This allows users to begin work without having to create documents in their entirety.

As another example of metadata, the user can also specify the type of project, which determines the structure of the project, that is, the specific, predefined folders that are automatically created for the project. Predefined folders ensure consistency across projects and cannot be renamed or deleted by a user. Project folders inherit metadata from the project, including the metadata inherited by the project from the account.

As yet another example of metadata, the user specifies the security for the project. The security determines the audience of potential viewers of the project while the project is active. Private projects are viewable to team members only and do not appear in any search results. Public projects appear in project-specific search results, but the contents of the project (i.e., folders and documents) are viewable and accessible to team members only. For a public project, the user specifies whether the project allows self-nomination. Self-nomination permits a non-team member to join the project without intervention from a current team member.

The user can also specify other team members using the directory services 44 (FIG. 1) of the CM system. The directory services 44 may employ an online name and address book or LDAP lookup to identify potential team members. The user creating the project is automatically added to the team member list when the project is created with a role of PM (Project Manager). The user may assign roles, such as Project Manager and Project Contributor, to each of the other team members. Other roles can be configured on a system or project basis.

Permissions on the project and its folders and documents are established based on project security and team membership. An email notifies each team member that he or she has been added to the project. The e-mail includes a universal resource locator (URL) pointing to the CM software 20 (FIG. 1). When the user activates the URL, the CM software 20 starts execution and the user logs into the CM system. The team member then opens and expands the navigation pane 204 to the specified project, selects the project name, and displays the properties (i.e., metadata) of the project in the content pane 208. The project is added to the Active Accounts and Active Projects and the navigation pane 204 is refreshed for each team member in the project.

After a project has been established (i.e., has become active), team members can propagate subsequent metadata changes to all existing lower levels of the hierarchy 100, or to apply those changes only to newly created objects in those lower levels.

Project Security

Enforcement of security in the CM system occurs on a project basis. Users are authenticated when accessing the CM system. Access control is defined and implemented on a project basis and changes dynamically as members are added and removed. Access control may be team-based, where team members have the same access rights, or specified by role.

Users have access to the accounts and projects for which they are team members. Only these projects appear in the navigation pane 204 of a given user. Only team members are allowed to perform actions in a project. A non-team member is not able to see a Private project. A non-team member is able see the existence of a Public project, but not any of its contents (i.e., its folders & documents). These objects are not returned in search results.

Self-nomination allows users to self-join a project; otherwise, the user needs a team member to add their name to the project membership list. Project membership can be restricted to named individuals by not allowing self-nomination.

Access control is also enforced based on a state of a project. Active projects are accessible by team members only. Folders and documents can be created, edited and deleted. Closed projects are read-only; no new documents or folders can be created, and existing documents and folders cannot be modified or deleted. All users can access closed projects as read-only, but only for those documents marked shareable. If a document is not shareable, access is restricted to the team members of the project.

Manager privileges can be shared if there are multiple project managers defined for a project. Individual (per object) activity or audit logs capture all activity (users and actions) on an account, project, folder, and document basis.

Editing Projects

Through the CM system, users can edit projects. A team member may edit an active project at any time. Metadata changes may be selectively or automatically propagated to existing folders and documents, or only to newly created folders (and then to newly created documents in those folders), based on the project profile (described below). While a project is active, user-defined folders can be created, edited, or deleted at any time. To be deleted, such folders must be empty. If a user changes the project type, which defines the folder structure of the project, folders are automatically created or deleted, and documents are moved accordingly, based on the project profile.

Adding or removing team members causes an email to be sent to each newly added or removed team member. The navigation pane of each new or former team member is automatically updated to reflect his or her new project membership status. Updated team membership is propagated to lower level objects in the project hierarchy for proper access control to those objects. Validation ensures the team member list is never empty.

Self-nomination can be turned on or off. If self-nomination is off, a "Join" action icon that appears in search results is disabled; if on, the Join action icon is enabled. A user can change the security setting for a project from public to private and from private to public. If a project becomes private, self-nomination is automatically disabled.

Joining Projects

A user may be invited to or desire to join a project, i.e., become a team member, without an explicit action of a current project team member. As described above, if self-nomination is enabled for the project, the user can add herself or himself as a team member. To join the project, the user searches for the project using appropriate search criteria. For example, the user can search for all projects for which he or she is eligible to join. Alternatively, the user can search for all projects of a given account, by project name, or by other project attributes.

The search results display an enabled Join action icon next to each project that the user is allowed to join. The icon is disabled if the user cannot join that project, e.g., because the user is already a team member, self nomination is not allowed, or the project is closed. Upon successfully joining a project, an email is sent to each Project Manager of the project, identifying the new team member who joined the project. Updated team membership is propagated to lower level objects (i.e., folders and documents) in the object hierarchy for proper access control. Also, the project is automatically added to the Active Account/Active Projects hierarchy of the new team member.

Project Cloning

Users can create new projects by "cloning" existing projects. If a given folder structure and defined metadata of an existing project, regardless of its state, are desired for another (i.e., new) project, a user can 'Clone' the existing project in the same or in a different account. When the cloning is completed, a new project with a name specified by the user is created, including all of the folders and metadata values as found in the cloned project. If the new project is cloned in a different account, metadata from that account propagates to the new project.

Closing Projects

Users can close a project, e.g., when deliverables are provided to the customer and the work is complete in its final form. After the project is closed, the documents of the project become "read-only" and are treated as knowledge (intellectual capital) for potential reuse by other users. No new documents can be created for the project. The project, folder, and document metadata are also made read-only. If any documents are still checked out when the project is being closed, a list of these documents is presented for review. The user can either require the documents to be checked in or cancel the closure of the project. Default behavior can be specified in the project profile.

Each document is associated with an attribute called "Document Shared upon Project Close." When the project closes, the user is presented a list of documents that have this attribute set to "No." For each document in the list, the user may select that document and change that value to "Yes," so that the documents can be shared (made publicly available) on project closure.

Upon closure, the CM system deletes every revision of each document but the last revision, deletes all documents in the Wastebasket folder, and then deletes the Wastebasket folder. The CM system also deletes solution template documents, if such documents are present, and then deletes the Templates folder. Access control for the project is changed so that each folder and document is no longer editable and so that each document that has been marked "Yes" for "Document Shared upon Project Close" is made globally read-only. Documents not shared on project closure are set to read-only for team members only. The project status is set to Closed and, for each team member, the project is moved from the Active Projects to the Closed Projects category of the navigation tree 216. When a source document is copied from a closed project, the original account, project, folder, and document names are saved in the destination document (i.e., the copy) so that the level of reuse of documents can be reported and analyzed.

Searching

Through the CM system, users are able to search for and leverage knowledge, and to take action on accounts, projects and documents returned as results of the search. Leveraging knowledge (intellectual capital) is the sharing and reuse of documents and other materials created in one project and used in another project. Users search for knowledge using metadata-based search capability. Users can perform simple and advanced searches. A simple search is keyword search with scope constraint. An advanced search adds full metadata field search capability. Scope constraint lets a user select the breadth of the search in addition to any other parameters of the search. That is, based on scope, searches are limited to the entire repository, to those projects, documents, or both for which the user is a team member, or to those accounts, projects or documents that meet the criteria specified in the user's personal search profile. The search criteria can be modified before the search is invoked.

Figure 5:
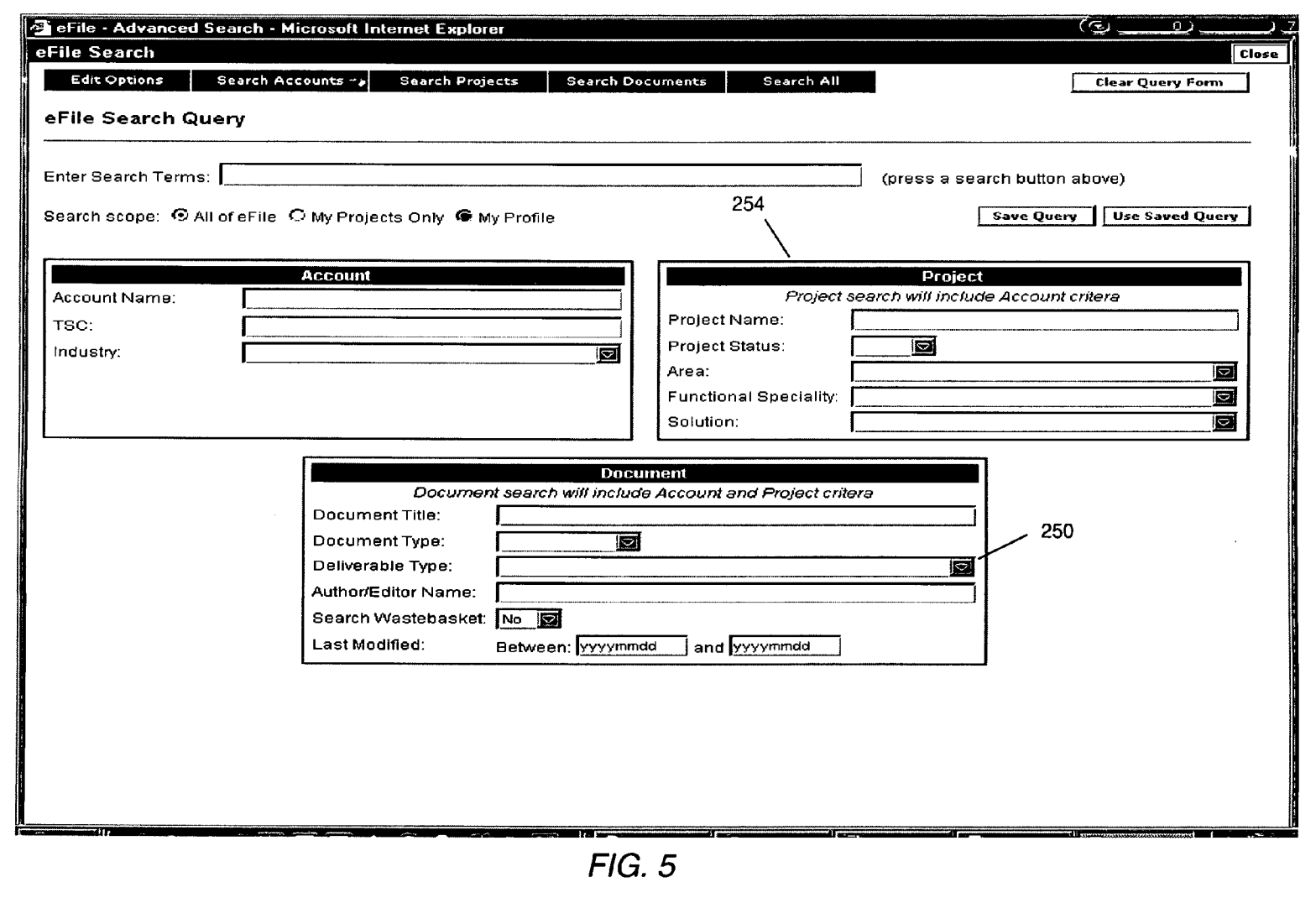

FIG. 5 shows an example of a screen shot presented to a user for submitting a search query. Searches can be made of accounts, projects and documents. A document search, for example, illustrated by the search box 250, includes data values specified in account and project metadata fields. In addition to these metadata fields, search queries also search through the contents of documents. Searches can include the Wastebasket. A project search, for example, illustrated by search box 254, includes data values specified in account metadata fields.

Search results are actionable. That is, users can take action on and work directly on those accounts, projects and documents returned as results of the search. Search results return active links, such as the account, project and folder of a document. These links are based on what is being searched. Selecting a link causes a new navigator window to open. The navigation tree 216 is expanded and the item of choice (object metadata or documents) shown in the content pane 208.

When a folder link is selected, for example, the folder view is displayed in the new navigation window and the user can now work in the new window as if he or she had the project open in the main navigation window. Documents can be copied, sent as mail, opened for viewing, and added to favorites. Selecting a document name opens the document for viewing.

The CM system provides three mechanisms by which team members can collaborate on a project: 1) through instant messaging; 2) through email; and 3) through document sharing Instant Messaging Users can collaborate in a project using instant messaging. When a user logs on to the CM system, the user is made aware of others who are also online (i.e., logged on to the CM system) and thus available for instant messaging. The user of the CM system can also instant message with someone who is not logged into the CM system, if that person has logged into an instant messaging client.

An instant messaging member list is automatically created for each project and consists of the team members of that project. This list is available from the banner pane 212 (FIG. 3) when a project or any of its folders or subfolders is selected. The list shows each user and whether that user is currently online.

When a project folder is selected and the folder view is displayed in the content pane 208, documents listed are shown with author and editor fields enabled for online awareness (see FIG. 4). Clicking on an enabled name opens an instant messaging session with that person. When a user views account or project metadata, team member names are enabled for online awareness and an instant messaging session can be initiated from the metadata view.

E-Mail

Users of the CM system can collaborate in a project through e-mail. From a folder view, a user can select one or more documents, including email messages saved as documents, and place them as attachments in a new email message created using the user's mail client 12 (FIG. 1). Instead of attachments, the user can place URL links to those documents in the email message.

From the mail client 12, a user can save an email message as a document with rich text (that is, including text formatting, embedded images, attachments, and links in the email). Saving an email message can be initiated upon sending an email message, after an email message has been sent, or upon receiving an email message. The document name of the saved email message is a combination of the subject, sender, and date of the email. The body of the email message is saved as a new document, such that links and attachments remain active. The original email body becomes a stub and is replaced with information about where the document was saved. The original email body includes buttons to open the document and to restore the email body.

From the mail client 12, a user composing an email can retrieve saved documents from a project folder and place them in an email as either attachments or URL links. A user can also save one or more email messages from their Inbox and attachments in received emails as documents in a project folder. Attachments can be saved either individually or in one batch-like operation. Saved email messages can be sent in a new email message with full fidelity and all links and attachments active.

Document Sharing

Users can also collaborate in a project through document sharing. Documents of the CM system are kept in a central repository (e.g., persistent storage 38 of FIG. 1). Team members have read and write access to documents associated with their active project, subject to document locking. To ensure document integrity, a user "checks out" a document before modifying that document. While checked out, the document is locked against editing by another user. Documents are unlocked (checked in) when the user completes modifications for a particular version.

The CM system keeps a revision history of each document, showing when the revision was made and the editor of the revision. As described above, online awareness is enabled for the author and editor fields so that a user can initiate a chat session with either person. An older version of a document may be promoted to the latest version if the newest version of the document is undesirable. Workflow processes are supported and can be defined on a document basis. Documents are assigned to team member(s) for review, edit, and approval or rejection.

The CM system provides users with various document-related capabilities. Users can create, view, edit, delete, rename, restore, check in, check out, send in email, copy, move, replace, search, add to and remove from "favorites," view revisions, promote, view activity, approve, and reject documents. Many operations, such as move, copy, delete, send in an email, and add to favorites, can be performed with multiple documents concurrently (multi-object support). The CM system enforces project-related business rules for some document operations. For example, documents may be moved across folders only within the same project and documents may only be copied to folders in an active project, subject to team membership.

The CM system implements a recycle bin-style folder called Wastebasket. Deleted documents are moved to the Wastebasket folder, from which they can be restored (undeleted) to their original folder. Deleted documents can be permanently erased from the Wastebasket folder. The Wastebasket folder is emptied and deleted upon project close.

Documents can be directly created, viewed, edited, and saved using a desktop application, such as Microsoft Word™. When opening and saving documents, the user navigates to the desired folder using the navigation tree 216 and a user selectable view such as My Projects or My Accounts.

Offline Capabilities

The CM system allows users to work offline (i.e., not logged into the CM system). Users can work offline in a manner that is similar to the way they work online. The CM system maintains the same organization structure (as found in the navigation tree 216) of accounts and projects in an offline location on the local drive of the user's client system 4. When a project is added to the user's navigation tree 216, the equivalent account/project folder structure is created in the offline location. When user-defined folders are added, deleted or renamed, corresponding folders are modified accordingly in the offline location.

A user can copy (for viewing) or checkout (for editing) documents for offline use. A user can operate on an entire project basis, on a folder basis, on a document-set basis, or on an individual document basis. Documents selected for offline use (copy or checkout) are automatically copied to the corresponding folder in the offline location, along with relevant metadata. An icon showing that the document is offline is displayed.

Figure 6:
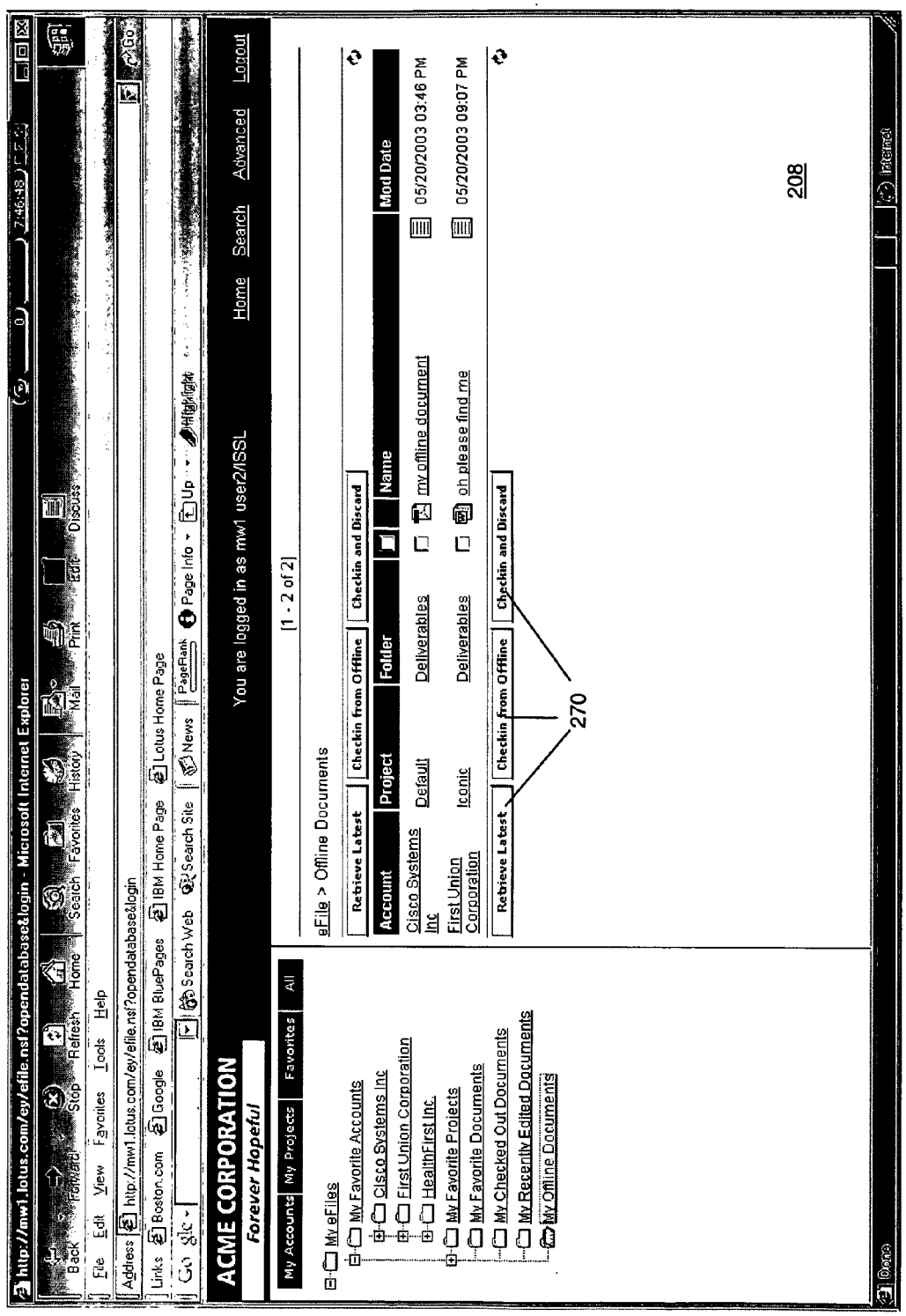
FIG. 6 is an exemplary screen shot of a view produced when a user selects his or her offline documents.

The user can optionally view and act upon his or her offline documents through a single virtual folder view (See FIG. 6). The view contains the account, project, and folder name, plus appropriate document information about each document.

Using graphical buttons 270 in the content pane 208, a user can synchronize his or her offline documents and automatically check in checked out documents that have been modified (and cancel the checkout of unmodified documents). A user can work (i.e. synchronize) on an entire project basis, on a folder basis, on a document-set basis, or on an individual document basis.

When offline, a user can view and edit documents, depending on mode. When back online, the user can do the following to his offline documents: delete them from his offline location, update his offline location with the latest version of documents, copy or check out additional documents, check out (for editing) documents only available for viewing, check in documents that have been modified, optionally leaving a copy in the offline location. A checkout is performed first if the document was not previously checked out, if another user does not have the document checked out at that time. Canceling check out (discard changes) optionally leaves a copy in the offline location.

Reporting

The CM system supports comprehensive reporting (e.g., predefined and ad-hoc reporting). Reports can be generated on any combination of criteria found across accounts, projects, folders, and documents.

Individual Profile

The CM system allows users to manage their individual profiles. Individual profiles determine how the users want the CM system to function for them. Each user can specify personalized behavior when they log into CM system. A user can specify the default navigation view to display upon logging in to the CM system, the default behavior for each of the navigation buttons, the root directory for saving offline documents (where the local account/project/folder hierarchy will be created), the action icons to display for documents displayed in the folder view in the content pane 208, and the default search criteria, which can be applied to any search query.

System Profile

Users can also manage a system profile. A system profile defines system-wide default functionality for all projects. An administrator can specify the types of projects that can be created, including the number of predefined folders to create, the name of each folder, and the business rules associated with the project type. Defined project types include, but are not limited to, 1) Standard Project with four predefined folders: Client Correspondence, Deliverables, Project Management, and Wastebasket; and 2) General Consulting with two predefined folders: Deliverables and Wastebasket. An administrator can specify the default behavior when changing from one project type to another, such as: a) Do not allow; and b) Allow only if number of folders match. An administrator can also specify the default values to provide for project type, project security, self-nomination, and other project attributes when creating a new project, the default metadata propagation behavior when editing a project, folder, or subfolder, including: propagate down only when a new object is created; and propagate down, upon save, to existing objects in the project.

Roles allowed in a project are also specifiable by an administrator. For example, two roles that can be defined by default are Project Manager and Project Contributor. An administrator can specify the default access control for team members, for example, allowing functionality to each team member or defining allowable functionality based on a team member's role.

Default solution template behavior, such as to populate or not to populate, and the location of solution template documents can also be specified. An administrator can specify if certain objects are allowed to be created, for example, whether subfolders are allowed or not allowed. An administrator can specify the default value for sharing documents upon closure of a project (i.e., yes or no).

Another specifiable feature is the default operation upon closing a project. Default operations include, but are not limited to, whether to delete all but the latest revision of each document, whether to prompt the user to change the sharing attribute value for a document, whether to cancel checked out documents or to prohibit the project from closing, whether to approve documents currently in a workflow process or to prohibit the project from closing, and whether to prohibit the project from closing if any documents have been rejected.

Various other features specifiable by an administrator include the default notification when a team member is added, removed, or self nominates; the default workflow process for documents where workflow is enabled; whether the Account Executive is by default a team member of each account's project; and whether each metadata field allows multi-value or single value.

Project Profile

Users can manage a project profile, which defines the behavior desired for a specific project. The system profile, defining system-wide behavior, can be overridden on a project basis in the project's profile, where applicable.

The present invention may be implemented as one or more computer-readable software programs embodied on or in one or more articles of manufacture. The article of manufacture can be, for example, any one or combination of a floppy disk, a hard disk, hard-disk drive, a CD-ROM, a DVD-ROM, a flash memory card, an EEPROM, an EPROM, a PROM, a RAM, a ROM, or a magnetic tape. In general, any standard or proprietary, programming or interpretive language can be used to produce the computer-readable software programs. Examples of such languages include C, C++, C#, Pascal, JAVA, BASIC, Visual Basic, Visual C++, and Visual C#. The software programs may be stored on or in one or more articles of manufacture as source code, object code, interpretive code, or executable code.

Although the invention has been shown and described with reference to specific preferred embodiments, it should be understood by those skilled in the art that various changes in form and detail may be made therein without departing from the spirit and scope of the invention as defined by the following claims.

What is claimed is:

1. A computer-implemented method for facilitating collaboration on a project by multiple team members, comprising:

storing objects including a plurality of projects and a plurality of project-related objects in persistent storage;

launching, by a user, an application program that places the objects into a multi-level hierarchy structure and that displays an expandable and collapsible view showing each project of the plurality of projects for which the user is a team member and each object linked to each of the projects;

associating metadata with each object at each level of the hierarchy structure, the metadata associated with each object at each level of the hierarchy structure describing content associated with that object;

propagating the metadata associated with an object at a given level in the hierarchy structure to one or more objects at a level below that given level to give each object both its own individual level metadata and metadata inherited from the level from which that object depends, the inherited metadata describing content associated with the object at the given level in the hierarchy structure, wherein the individual level metadata and the inherited metadata are independently formed, are unmodified, and coexist with each other at the same time at the one or more objects at the level below the given level;

searching for an object that satisfies specified search criteria by comparing a search term supplied by the user with both the individual level metadata and the inherited metadata associated with objects in the hierarchy structure; and initiating an instant messaging session with an individual associated with an object found during the search, including generating a list of the team members for the project corresponding to the object, and displaying an online status of each team member in the list.

2. The computer-implemented method of claim 1, further comprising dynamically updating the expandable view of projects for which the user is a team member whenever team membership of the user changes for one of the plurality of projects.

3. The computer-implemented method of claim 1, further comprising:

associating one or more of the projects with an account at an account level in the hierarchy structure;

associating metadata with each account at the account level; and propagating the metadata of each account at the account level to a level below the account level in the hierarchy structure.

4. The computer-implemented method of claim 1, further comprising:

changing the metadata at a particular level in the hierarchy structure; and propagating the modified metadata at the particular level to a level below in the hierarchy structure.

5. The computer-implemented method of claim 1, further comprising saving an email message that appears in the expandable view as an object linked to one of the projects.

6. The computer-implemented method of claim 1, further comprising selecting objects linked to one of the projects to become publicly accessible for viewing by non-team members upon closure of that project.

7. The computer-implemented method of claim 1, wherein the expandable view is a navigation tree showing a hierarchical relationship between the projects and each object linked to each project.

8. The computer-implemented method of claim 1, further comprising maintaining a copy of the expandable view at an offline location for offline access by the user to each project and object.

9. The computer-implemented method of claim 1, wherein the project-related objects are documents.

10. The computer-implemented method of claim 1, further comprising assigning at least one project type to each project of the plurality of projects.

11. The computer-implemented method of claim 10, further comprising generating at least one template folder for each project based on the at least one project type assigned to that project.

12. The computer-implemented method of claim 1, further comprising:
- returning an object that satisfies the specified search criteria; and
- identifying from the inherited metadata of the returned object an account and a project to which the returned object belongs.

13. The computer-implemented method of claim 1, wherein the inherited metadata with which the search term is compared includes metadata inherited from a project level in the hierarchy structure and metadata inherited from an account level in the hierarchy structure.

14. The computer-implemented method of claim 1, wherein searching for an object that satisfies specified search criteria includes searching at a project level in the hierarchy structure, and wherein the inherited metadata includes metadata inherited from an account level in the hierarchy structure.

15. The computer-implemented method of claim 1, wherein the project-related objects include folders and subfolders.

16. The computer-implemented method of claim 1, further comprising:
- creating a new project;
- assigning a solution type to the new project;
- creating for the new project, in response to the solution type assigned to the new project, a new predefined template folder automatically populated with template documents.

17. The computer-implemented method of claim 1, further comprising:
- creating a new project;
- specifying a type of the new project;
- creating a set of unchangeable predefined folders tailored to the type of the new project; and
- placing the new project at a project level in the hierarchy structure and the set of unchangeable predefined folders in the hierarchy structure below the project level.

\* \* \* \* \*